(12) United States Patent
Muramatsu et al.

(10) Patent No.: US 6,225,786 B1
(45) Date of Patent: May 1, 2001

(54) BATTERY CHARGER

(75) Inventors: Tomoo Muramatsu; Kazuyuki Sakakibara, both of Anjo (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 09/527,126

(22) Filed: Mar. 16, 2000

(30) Foreign Application Priority Data

Mar. 25, 1999 (JP) .................................. 11-081247

(51) Int. Cl.[7] .................................. H01M 10/46
(52) U.S. Cl. .................................. 320/150
(58) Field of Search .................................. 320/116, 119, 320/124, 125, 127, 128, 137, 144, 150, 151, 152, 153

(56) References Cited

U.S. PATENT DOCUMENTS

| | | |
|---|---|---|
| 5,241,259 | 8/1993 | Patino et al. . |
| 5,497,068 | 3/1996 | Shiojima . |
| 5,592,070 | 1/1997 | Mino . |
| 5,652,500 | 7/1997 | Kadouchi et al. . |
| 5,659,239 | 8/1997 | Sanchez et al. . |
| 5,739,673 | 4/1998 | Le Van Suu . |
| 5,886,527 | 3/1999 | Ito . |
| 5,912,547 | 6/1999 | Grabon . |

FOREIGN PATENT DOCUMENTS

| | | |
|---|---|---|
| 200693 | 5/1993 | (DE) . |
| 0621 990 B1 | 6/1996 | (EP) . |
| 05244729 | 9/1993 | (JP) . |
| 06121468 | 4/1994 | (JP) . |
| 07007865 | 1/1995 | (JP) . |
| 07123604 | 5/1995 | (JP) . |
| 07153497 | 6/1995 | (JP) . |
| 07284235 | 10/1995 | (JP) . |
| 18298140 | 11/1996 | (JP) . |
| 08327711 | 12/1996 | (JP) . |
| 10014125 | 1/1998 | (JP) . |
| WO 91/08604 | 6/1991 | (WO) . |
| WO 95/09471 | 4/1995 | (WO) . |

*Primary Examiner*—Edward H. Tso
(74) *Attorney, Agent, or Firm*—Weslh & Katz, Ltd.; Thomas W. Toplin (57) ABSTRACT

A map is retrieved based on a battery temperature, a temperature rise value and an allowable current value, with which a battery can be charged while battery temperature rise is being suppressed, is obtained and the battery is charged with the allowable current value. By doing so, it is possible to charge a nickel metal hydride battery cell which temperature tends to rise during battery charge in a short time without causing deterioration due to temperature rise. This battery charger makes determinations after dividing the battery. Due to this, compared with a case of simultaneously determining all battery cells, it is possible to accurately determine the completion of charge.

4 Claims, 9 Drawing Sheets

| dT/dt | | ~T$_1$ | T$_1$~T$_2$ | T$_2$~T$_3$ | T$_3$~T$_4$ | T$_4$~T$_5$ | T$_5$~ |
|---|---|---|---|---|---|---|---|
| | ~X$_1$ | I$_{11}$ | I$_{12}$ | I$_{13}$ | I$_{14}$ | I$_{15}$ | I$_{16}$ |
| | X$_1$~X$_2$ | I$_{21}$ | I$_{22}$ | I$_{23}$ | I$_{24}$ | I$_{25}$ | I$_{26}$ |
| | X$_2$~X$_3$ | I$_{31}$ | I$_{32}$ | I$_{33}$ | I$_{34}$ | I$_{35}$ (1) | I$_{36}$ |
| | X$_3$~X$_4$ | I$_{41}$ | I$_{42}$ | I$_{43}$ | I$_{44}$ | I$_{45}$ (2) | I$_{46}$ |
| | X$_4$~X$_5$ | I$_{51}$ | I$_{52}$ | I$_{53}$ | I$_{54}$ | I$_{55}$ | I$_{56}$ |
| | X$_6$~ | I$_{61}$ | I$_{62}$ (3) | I$_{63}$ | I$_{64}$ | I$_{65}$ | I$_{66}$ |

ITI

BATTERY CHARGER

BACKGROUND OF THE INVENTION

1. Field of the Invention

The present invention relates to a battery charger suited for charging a battery, such as a nickel metal hydride battery, which emits high heat while being charged.

2. Discussion of the Prior Art

Presently, a battery pack housing chargeable batteries which can be repeatedly used for the power supply of, for example, a power tool is used. A nickel cadmium battery is popular as a battery for the power tool.

The inventor of the present invention studied improving the performance of a power tool by employing a nickel metal hydride battery as a battery therefor. Although the nickel metal hydride battery can increase a capacity compared with a nickel cadmium battery, it generates high heat while being charged. If the temperature of the battery becomes high by the generated heat, the electrodes and separators of the cells within the battery deteriorate and battery life is shortened. Further, the nickel metal hydride battery is less resistant against overcharge than the nickel cadmium battery. If overcharged, the battery life is shortened. It is, therefore, necessary to avoid overcharge.

Considering this, the inventor of the present invention contrived a method of controlling charging current and detecting the completion of charge based on a map for determining a current value based on the absolute temperature of the battery and a temperature rise value. With this method, however, if the number of battery cells in a battery pack increases, a battery cell positioned on the end portion of the battery pack tends to be cooled and that on the central portion thereof is difficult to cool, with the result that the completion of charge cannot be detected based on the battery temperature. Furthermore, if the temperatures of the cells in the battery pack become increasingly irregular, the life of a high temperature cell is shortened and the high temperature cell is difficult to charge. Due to this, the capacities become unbalanced among the cells and it may occur that there is a cell charged 100% and one charged 90% (high temperature cell). Here, if the capacity of the battery pack is used up to 90%, some cells have a residual capacity of 10% and the others have a residual capacity of 0% (high temperature cell). The cells of 0% residual capacity are reverse-charged by those of 10% residual capacity and the battery life is considerably shortened.

SUMMARY OF THE INVENTION

The present invention has been made to solve the above-stated problems and an object of the invention is to provide a battery charger capable of appropriately charging a battery pack including many battery cells.

In order to accomplish the said object, a battery charger dividing and charging a battery consisting of a plurality of battery cells, according to the present invention characterized by comprising:

- a storage device storing a map, in which an allowable current value, with which the battery can be charged while a temperature rise of the battery is being suppressed, is mapped based on a battery temperature value and a battery temperature rise value;
- a temperature detecting section for detecting a present battery temperature;
- a temperature rise value outputting section for obtaining the temperature rise value from the temperature detected by said temperature detecting section;
- an allowable current value retrieving section for retrieving the map of said storage device based on the temperature detected by said temperature detecting section and the temperature rise value outputted from said temperature rise value outputting section, and for obtaining said allowable current value;
- a charging section for charging said divided battery with the allowable current value retrieved by said allowable current value retrieving section; and
- a charge switching section for alternately switching divided blocks to be charged by said charging section.

A battery charger dividing a battery consisting of a plurality of battery cells into two or more blocks and charging the divided blocks, according to the present invention characterized by comprising:

- a storage device storing a map, in which an allowable current value, with which the battery can be charged while a temperature rise of the battery is being suppressed, is mapped based on a battery temperature value and a battery temperature rise value, the allowable current value set at a low value if the battery temperature value is high and set at a low value if the temperature rise value is high;
- a temperature detecting section for detecting a present battery temperature;
- a temperature rise value outputting section for obtaining the temperature rise value from the temperature detected by said temperature detecting section;
- an allowable current value retrieving section for retrieving the map of said storage device based on the temperature detected by said temperature detecting section and the temperature rise value outputted from said temperature rise value outputting section, and for obtaining said allowable current value;
- a charging section for charging said divided battery blocks with the allowable current value retrieved by said allowable current value retrieving section;
- a charge switching section for alternately switching the divided battery blocks to be charged by said charge section;
- a charge completion determining section for determining completion of charge of each of the divided battery blocks based on whether frequency, with which the temperature detected by said temperature detecting section and the temperature rise value outputted from said temperature rise value outputting section belong to regions indicating a final charging period in the map of said storage device, is high; and
- a charge completing section for completing charge of the divided battery blocks based on determination of completion of battery charge by said charge completion determining section.

A battery charger capable of charging a battery consisting simultaneously of a plurality of battery cells and dividing the battery into two or more blocks and then charging the divided battery blocks, according to the present invention characterized by comprising:

- a storage device storing a map, in which an allowable current value, with which the battery can be charged while a temperature rise of the battery is being suppressed, is mapped based on a battery temperature value and a battery temperature rise value;
- a temperature detecting section for detecting a present battery temperature;
- a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging the battery with the allowable current value retrieved by said allowable current value retrieving section; and a charge switching section for switching said charging section and charging the battery consisting of the plurality of battery cells simultaneously or charging the battery separately, wherein said charge switching section simultaneously charges the battery consisting of the plurality of battery cells at beginning of battery charge, and alternately switches the divided battery blocks and charges the divided battery blocks in a final charging period.

A battery charger dividing a battery consisting of a plurality of cells into two or more blocks and charging the divided battery blocks, according to the present invention characterized by comprising:

a storage device storing a map, in which an allowable current value, with which the battery can be charged while a temperature rise of the battery is being suppressed, is mapped based on a battery temperature value and a battery temperature rise value, the allowable current value set at a low value if the battery temperature value is high and set at a low value if the temperature rise value is high;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charge switching section for switching said charging section and charging the battery consisting of the plurality of battery cells simultaneously or charging the battery separately;

a final charging period determining section for determining that a battery charge period is in a final charging period based on whether or not frequency, with which the temperature detected by said temperature detecting section and the temperature rise value outputted from said temperature rise value outputting section belong to regions indicating the final charging period in the map of said storage section, is high; and a charge completion determining section for determining completion of charge of each of the divided battery blocks based on whether or not the frequency, with which the temperature detected by said temperature detecting section and the temperature rise value outputted from said temperature rise value outputting section belong to the regions indicating the final charging period in the map of said storage section, is high, wherein said charge switching section simultaneously charges the battery consisting of the plurality of battery cells at beginning of battery charge and, if the battery charge period is determined to be in the final charging period by said final charging period determining section, alternately switches the battery divided by the charge switching section and charges the battery until said charge completion determining section determines the completion of charge.

A battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge the nickel metal hydride battery which temperature tends to rise during charge, in a short time without causing deterioration due to temperature rise. Since the divided battery cells are alternately switched, i.e., the battery cells in one block are charged while those in the other block are being cooled, it is possible to efficiently charge the battery even just before the completion of battery charge.

A battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge a nickel metal hydride battery which temperature tends to rise during charge, in a short time without causing deterioration due to temperature rise.

Particularly, charge completion is determined based on whether or not the temperature rise value is relatively high and the frequency, with which a relatively low allowable current value is outputted from the map, is high, i.e., whether or not temperature rise is large and temperature rise is still large even with a charging current value being lowered. Due to this, it is possible to 100% charge the battery without overcharging it irrespective of the residual capacity of the battery, temperature and the like. Further, since this battery charger determines the completion of charge by dividing the battery, it is possible to accurately determine the completion of charge compared with a case of simultaneously determining it for all battery cells.

A battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge a nickel metal hydride battery which temperature tends to rise during charge, in a short time without causing deterioration due to temperature rise. Further, since all the battery cells are simultaneously charged at the beginning of battery charge in which lower heat generated and then the battery cells are charged while dividing the battery and alternately switching the charge target battery cells, i.e., the battery cells in one block are charged while those in one block are being cooled in the final charging period in which high heat is generated, it is possible to efficiently charge the battery in a short time.

A battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge a nickel metal hydride battery which temperature tends to rise during charge, in a short time without causing deterioration due to temperature rise. Further, since all the battery cells are simultaneously charged at the beginning of battery charge in which lower heat generated and then the battery cells are charged while dividing the battery cells and alternately switching the charge target battery cells, i.e., the battery cells in one block are charged while those in the other block are being cooled in the final charging period in which high heat is generated, it is possible to efficiently charge the battery in a short time.

Particularly, final charging period is determined based on whether or not the temperature rise value is relatively high and the frequency, with which a relatively low allowable current value is outputted from the map, i.e., whether or not temperature rise is large and temperature rise is still large even with a charging current value being lowered. Due to this, it is possible to appropriately judge timing for switching charge operation to division charge and to efficiently shorten charging time. Besides, charge completion is determined based on whether or not the temperature rise value is relatively high and the frequency, with which a relatively low allowable current value is outputted from the map, is high. Due to this, it is possible to 100% charge the battery cells without overcharging it irrespective of the residual capacity of the battery, battery temperature and the like. Further, since this battery charger determines the completion of charge by dividing the battery, it is possible to accurately determine the completion of charge compared with a case of simultaneously determining it for all battery cells.

DESCRIPTION OF THE PREFERRED EMBODIMENTS

Battery chargers according to the embodiments of the present invention will be described hereinafter with reference to the accompanying drawings.

Figure 1:
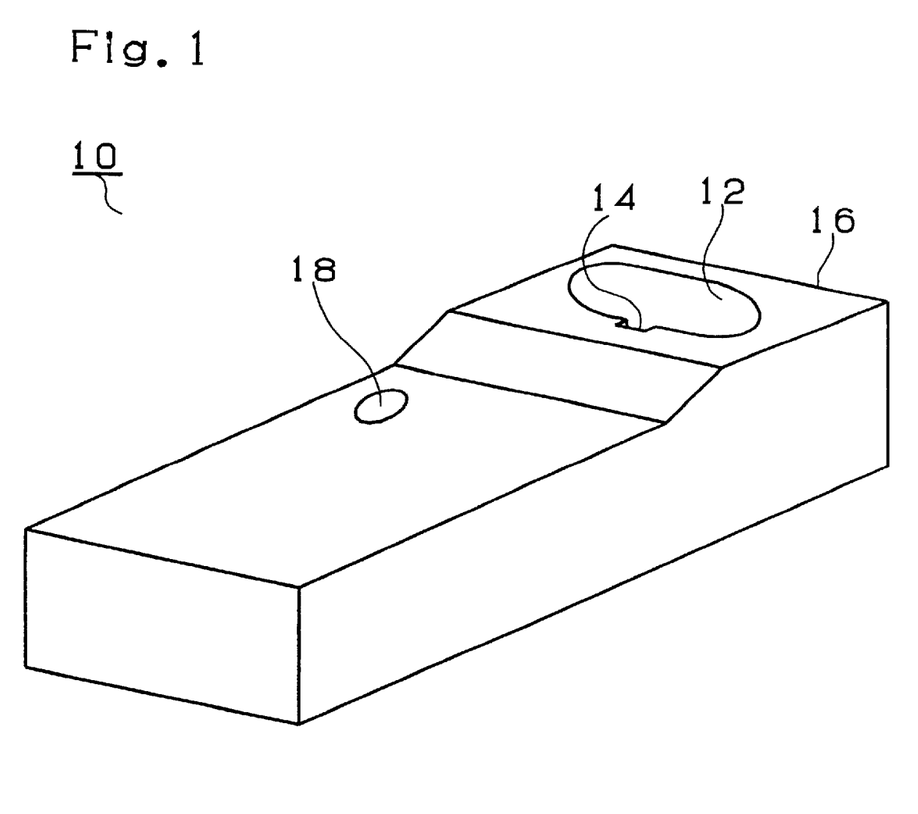
FIG. 1 is a perspective view of a battery charger in the first embodiment according to the present invention.
Figure 2:
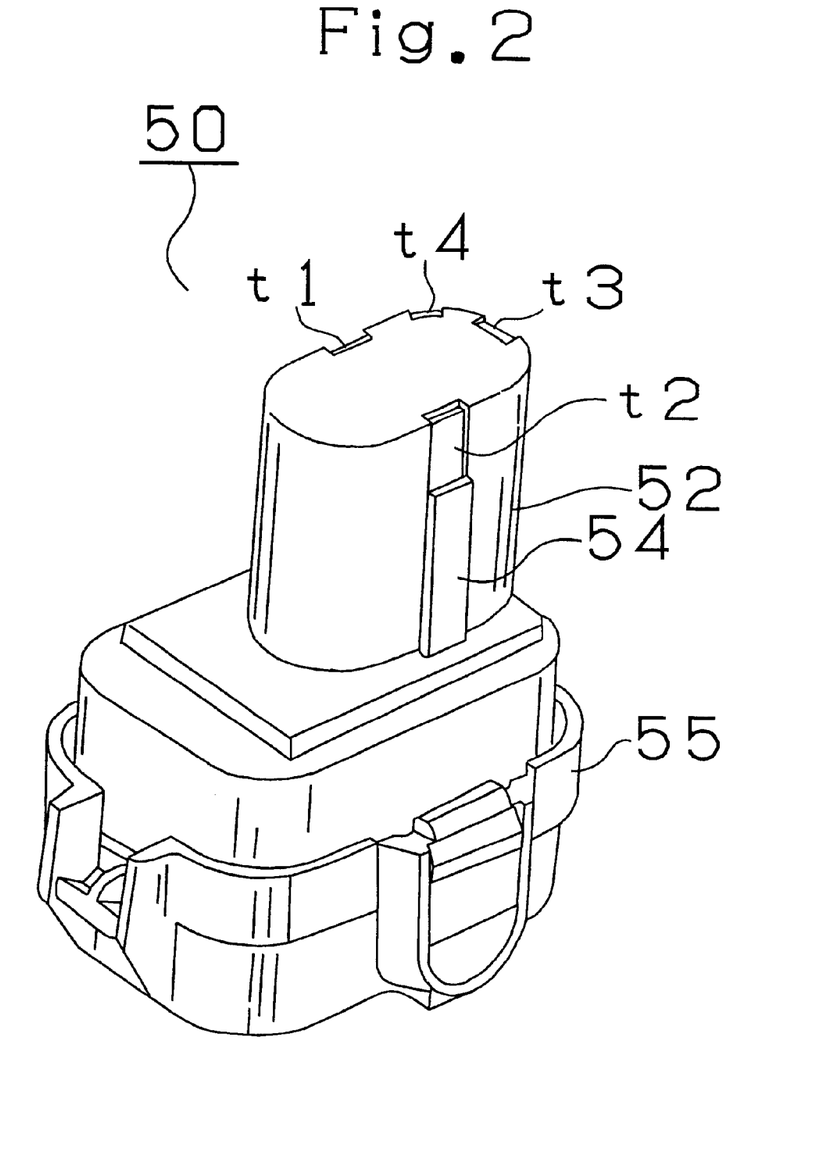
FIG. 2 is a perspective view of a battery pack in the first embodiment according to the present invention.
Figure 3:
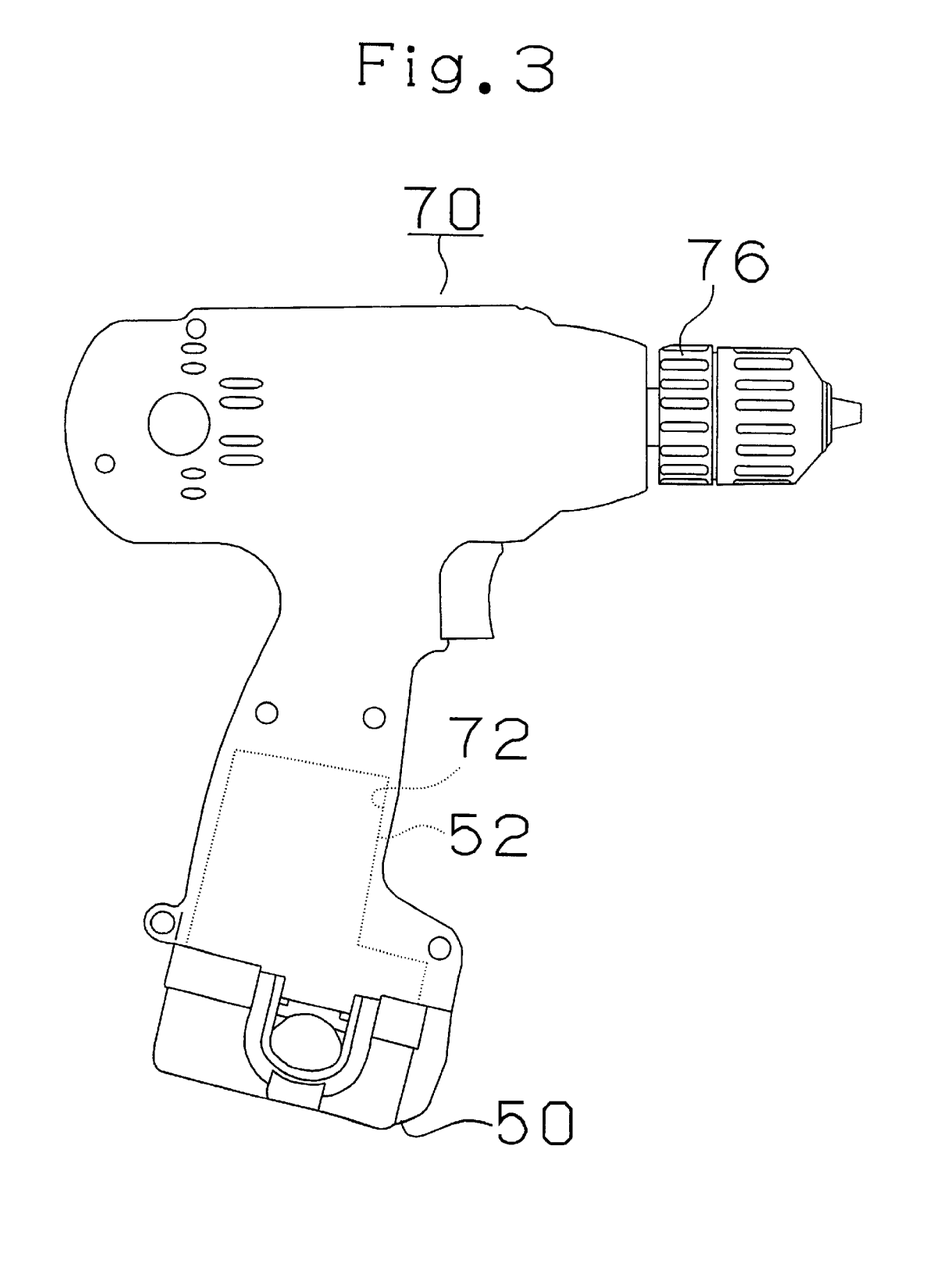
FIG. 3 is a front view of a battery drill employing the battery pack shown in FIG. 2.

FIG. 1 shows a battery charger 10 in the first embodiment according to the present invention. FIG. 2 shows a battery pack 50 charged by the battery charger 10. FIG. 3 shows a battery drill 70 driven by the battery pack 50.

As shown in FIG. 2, the battery pack 50 including nickel hydride batteries consists of a generally cylindrical fitted part 52 and a generally prismatic base 55. A key-shaped key part 54 is formed on the side of the fitted part 52. The first input terminal t1 connected to the positive electrode of the battery, the second input terminal t2 connected to the negative electrode thereof, the third terminal t3 which is the intermediate terminal between the first and second input terminals and the fourth terminal t4 connected to a temperature sensor consisting of a thermistor, are arranged on the upper portion of the fitted part 52.

As shown in FIG. 1, a fitting hole 12 into which the fitted part 52 of the battery pack 50 is fitted, is formed in the battery charger 10 charging the battery pack 50. A keyway 14 for introducing the key part 54 of the fitted part 52, is formed on the sidewall of the fitting hole 12. The fitting hole 12 is resin molded integrally with a housing 16 for forming the battery charger 10. In this embodiment, the key part 54 is provided at the fitted part 52 of the battery pack 50 and the keyway 14 is provided at the fitting hole 12 of the battery charger 10, thereby preventing the battery pack 50 from being installed in a wrong direction. The first to fourth output terminals, which are not shown, are provided at the bottom of the fitting hole 12 to contact with the first to fourth terminals t1, t2, t3 and t4 of the battery pack 50, respectively. An LED lamp 18 is provided on the upper portion of the battery charger 10 to indicate that a battery is being charged.

As shown in FIG. 3, the battery drill 70 is provided with a fitting hole 72 into which the fitted part 52 of the battery pack 50 is fitted, and is constituted that a chuck 76 is rotated by a motor, which is not shown, when supplied with power from the first input terminal t1 and the second input terminal t2 of the battery pack 50. When the battery drill 70 is used, a plurality of battery cells in the battery pack 50 which are completed with charge are sequentially used so that the battery drill 70 can continuously operate.

Figure 4:
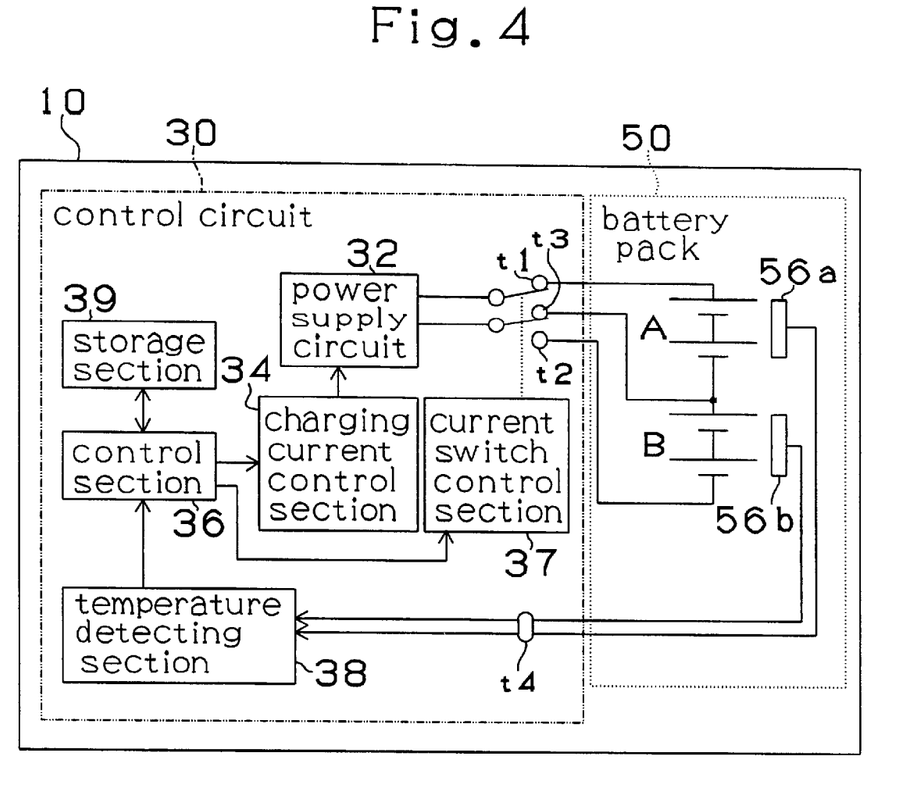
FIG. 4 is a block diagram showing a control circuit in the battery charger shown in FIG. 1.

FIG. 4 shows the configurations of a control circuit 30 and the battery pack 50 in the battery charger 10. The battery pack 50 houses 20 1.2V nickel metal hydride battery cells and can thereby output 24V between the first terminal t1 and the second terminal t2. The intermediate terminal t3 is provided between the first to tenth battery cells and the eleventh to 20th battery cells. By applying a voltage between the first terminal t1 and the intermediate terminal t3, the first to tenth battery cells (to be referred to as "block A" hereinafter) can be charged. Also, by applying a voltage between the intermediate terminal t3 and the second terminal t2, the eleventh to 20th battery cells (to be referred to as "block B" hereinafter) can be charged.

On the other hand, the control circuit 30 of the battery charger 10 consists of a temperature detecting section 38 detecting battery temperatures from output values obtained from temperature sensors (thermistors) 56a (block A-side sensor) and 56b (block B-side sensor), a storage section 39 storing current value control information such as a map to be described later, a control section 36 differentiating the temperature values outputted from the temperature detecting section 38, obtaining a temperature rise value, obtaining a current value with which battery cells are chargeable while suppressing the temperature rise value and outputting the current value as a current command value to a charging current control section 34, the charging current control section 34 controlling a power supply circuit 32 based on the current command value from the control section 36 and adjusting battery charging current, the power supply circuit 32 applying a voltage between the first terminal t1 and the intermediate terminal t3 of the battery pack 50 to thereby charge the block A or applying a voltage between the intermediate terminal t3 and the second terminal t2 to thereby charge the block B, and a current switch control section 37 switching battery charge by the power supply circuit between the block A and the block B.

Figure 5:
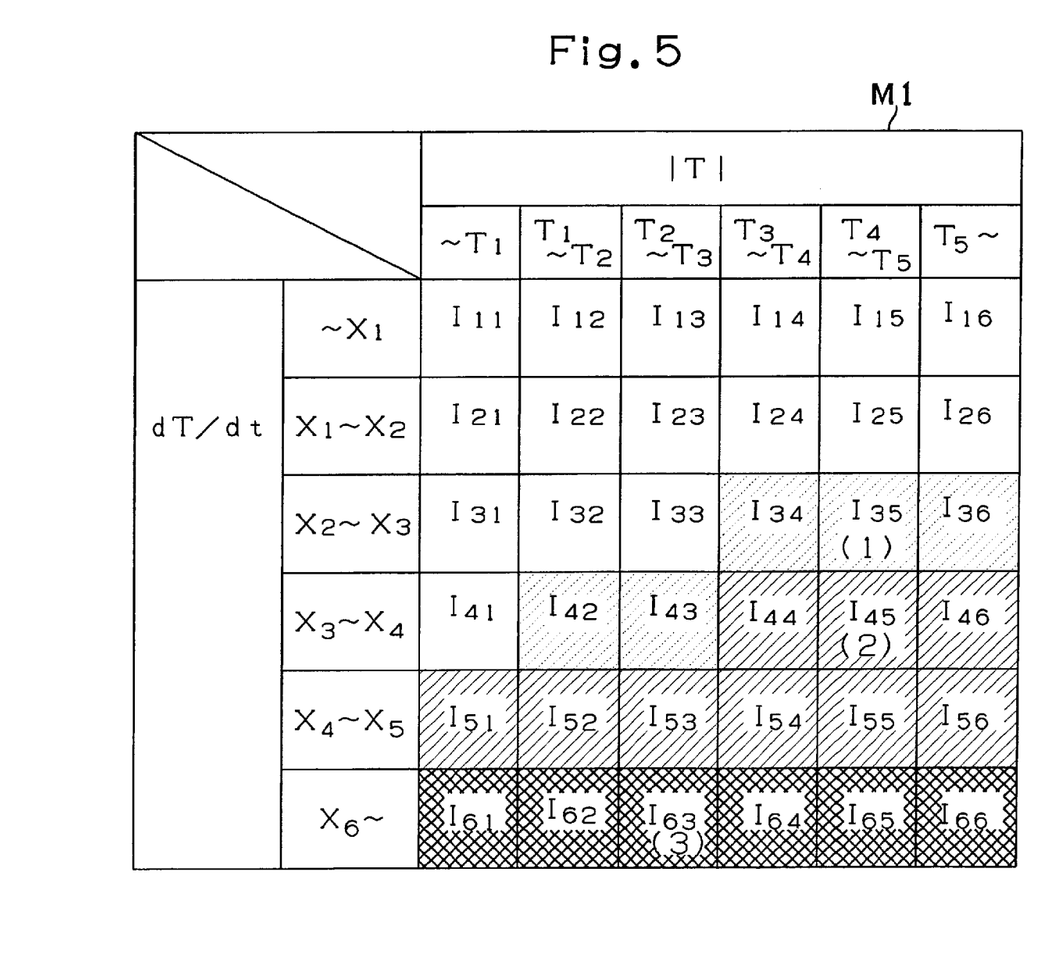
FIG. 5 is an explanatory view for the content of a map held by the control circuit in the first embodiment.

Now, the configuration of a map used for current control as stated above will be described with reference to FIG. 5.

Normally, if charging current for a battery cell increases, charging time becomes shorter and temperature rise becomes larger. Conversely, if charging current decreases, charging time becomes longer and temperature rise becomes smaller. A nickel metal hydride battery cell, in particular, has characteristics that a temperature gradient (temperature rise value) varies greatly with charging current and the already charged capacity. Due to this, in this embodiment, battery charge is conducted while changing current values so as to suppress temperature rise. In other words, the conventional battery charger charges a battery with a fixed current value, whereas the battery charger in this embodiment determines the state of a battery cell based on the absolute temperature and a temperature rise value and charges the battery cell while changing current values as high as possible with which the temperature rise of the battery cell can be suppressed, that is, while changing current values according to the state of the battery cell.

In this embodiment, if battery temperature is high, relatively low charging current is applied to the battery cell. If the battery temperature is low, relatively high charging current is applied to the battery cell. Also, if temperature rise is large, relatively low charging current is applied to the battery cell. If temperature rise is small, relatively high charging current is applied to the battery cell.

The map is provided to conduct variable-control for the current as stated above and to specify an optimum current value. In the map, the horizontal axis indicates the absolute temperature T and the vertical axis indicates a change in temperature dT/dt. Namely, if battery temperature is high and temperature rise is large (lower right in the map), relatively low charging current is applied to the battery cell. If battery temperature is high and temperature rise is small (upper right in the map), medium charging current is applied to the battery cell. If battery temperature is low and temperature rise is large (lower left in the map), medium charging current is applied to the battery cell. If battery temperature is low and temperature rise is small (upper left in the map), relatively high charging current is applied to the battery cell. In short, optimum current values are set in the respective regions in the map so as to satisfy both a target charging time (about 20 minutes) and a target temperature which the battery cell reaches.

If a battery cell is charged with high current at low temperature (0° C. or lower), battery performance deteriorates. Due to this, it is desirable to set low current values in the left row of the map so as not to deteriorate battery performance.

A suited region is retrieved from the absolute temperature T of the battery and a change in temperature dT/dt during battery charge based on this map. Charging current is then controlled based on a current value specified in the region. For instance, if battery temperature is between T3 and T4 and a change in battery temperature (or a temperature rise value) is between X1 and X2, then a current value in a region I24 is outputted.

Furthermore, the battery charger in this embodiment detects the completion of battery charge based on the movement of regions in the map. That is, the battery charger according to the conventional technique detects the completion of battery charge by monitoring either temperature or voltage while charging current is set at a fixed level. More specifically, the conventional battery charger detects a temperature rise value, a change in voltage and the decrease of voltage after the battery cell is fully charged, thereby determining that the battery cell is fully charged. In the battery charger in this embodiment, by contrast, charge target battery cells are switched between the block A and the block B and charging current is changed as stated above. Due to this, the battery charger in this embodiment cannot detect the completion of battery charge only by monitoring a temperature and a change in temperature or a voltage and a change in voltage. In this embodiment, therefore, the battery charger detects the completion of battery charge based on the movement of the regions in the map.

During battery charge, the charging current value moves apparently at random in the regions of the map according to the change of the temperature and that of the temperature rise value. Namely, before the battery cell is fully charged, if temperature increases or temperature rise increases and a relatively small charging current region is selected, that is, if the lower right region in the map shown in FIG. 5 is selected, then temperature rise becomes smaller by the decrease of current and a charging current value corresponds to that in upper regions on the map.

However, as the battery cell is close to a fully charged state, a temperature rise value increases due to the characteristics of the nickel metal hydride battery cell. That is to say, while a lower region in the map is selected because of large temperature rise and relatively low current is applied to the battery cell, temperature rise remains large. Based on this principle, the battery charger in this embodiment makes measurements in a predetermined cycle (e.g., several hundred seconds' cycle). In a case where regions in which temperature rise is large and in which temperature is high and temperature rise is medium, as hatched in the map, and are selected with high frequency, it is determined that battery charge is completed.

This battery charger gives weight to the map regions so as to appropriately determine the completion of charge. That is, "1" is added to regions (1), i.e., I42, I43, I34, I35 and I36 which tend to occur in the initial charge completion period. To regions (2), i.e., I51, I52, I53, I44, I45, I46, I54, I55 and I56 which tend to occur in the medium charge completion period, "2" is added. To regions (3), i.e., I61, I62, I63, I64, I65 and I66 which tend to occur in the final charge completion period, "3" is added. By doing so, it is detected that the battery cell can be accurately charged up to a target capacity.

Figure 6:
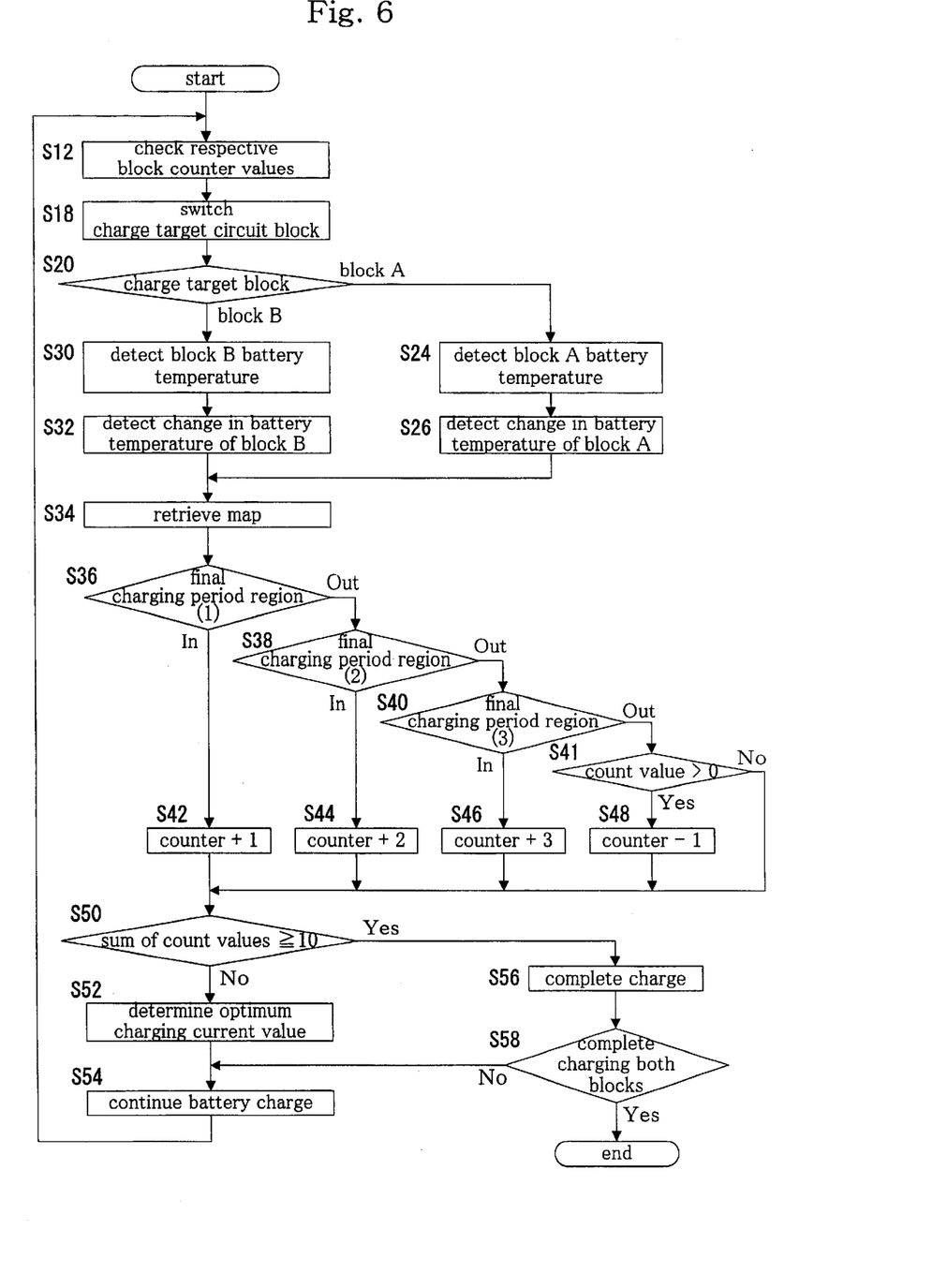
FIG. 6 is a flow chart showing the processing of the control circuit in the first embodiment.

The specific processings by the battery charger in this embodiment will be described based on the flow chart of FIG. 6.

When battery charge starts, the control section 36 of the control circuit (see FIG. 4) adjusts charging current and determines the completion of battery charge in a predetermined cycle (in this case, a 100-second cycle for convenience; actually shorter cycle, i.e., a cycle of not more than 10 seconds). First, the value of a block A counter indicating the progress of the charge of the block A (first to tenth battery cells) and that of a block B counter indicating the progress of the charge of the block B (eleventh to 20th battery cells) are checked (in S12) and it is determined which is set as a charge target block, the block A or the block B (in S20). If the block A is set as a charge target block, the processing goes to a step 24, where the absolute temperature T of the nickel metal hydride battery cells in the block A is detected (in S24). Next, the inputted absolute temperature T is differentiated and a change in battery temperature dT/dt is calculated (in S26). Based on the absolute temperature T and the change in temperature dT/dt and referring to FIG. 5, an optimum charging current is selected from the above-stated map (in S34). In an initial charging period, the absolute temperature T is low and the change in temperature dT/dt is small, so that a relatively high current is retrieved.

Thereafter, the control section 36 determines whether the state of battery charge enters the final charging period regions of the map in steps 36 to 48. The control section 36 then determines whether a count value exceeds 10 ("No" in S50) and the block A is charged with the value retrieved in the step 34 (in S52 and S54).

When a predetermined time (20 seconds) pass, the charge target block is switched (in S18). In this embodiment, the control section 36 controls the current switch control section 37, whereby the charged terminals of the power supply circuit 32 are switched from the first terminal t1—intermediate terminal t3 to the intermediate terminal t3—the second terminal t2 and the block B charge is started (in S30 and S32) When a predetermined time (20 seconds) passes, the block A charge is started (in S18).

While alternately switching the charge target block between the blocks A and B, charge is conducted for 20 seconds apiece. In the final charging period, if the battery temperature and the battery temperature change value are in the regions which tend to occur in the initial charge completion period (final charging period region (1), i.e., I42, I43, I34, I35 and I36 ("In" in S36), the block A counter is incremented by "1" while block A is being charged and the block B counter is incremented by "1" while block B is being charged (in S42) If they are in the regions which tend to occur in the medium charge completion period (final charging period region (2)), i.e., I51, I52, I53, I44, I45, I46, I54, I55 and I56 ("In" in S38), the counter is incremented by "2" (in S44) . Further, if they are in the regions which tend to occur in the final charge completion period (final charging period region (3)), i.e., I61, I62, I63, I64, I65 and I66 ("In" in S40), the counter is incremented by "3" (in S46). Then, it is determined whether the sum of count values exceed a preset value (10) (in S50). If the battery temperature and the battery temperature change value continuously belong to the above-stated final charging period regions and the sum of the count values exceeds the preset value of 10 ("Yes" in S50), then the charge of the relevant block (e.g., the block A) is completed (in S56). Thereafter, until the charge of the block B is completed, i.e., the block B counter becomes 10 ("No" in S58), battery charge is continued (in S54). If the charge of the block B is completed ("Yes" in S58), charge processing is completed.

The battery charger in the first embodiment employs a map in which an allowable current value with which battery cells can be charged while the battery temperature rise is being suppressed is mapped based on battery temperature values and battery temperature rise values. That is, the map is retrieved, the allowable current value with which the battery cells can be charged while the battery temperature rise is being suppressed, is obtained and the battery cells are then charged with the allowable current value. This makes it possible to charge the nickel metal hydride battery cells, which temperature tends to increase during battery charge, in a short time without causing deterioration due to temperature rise. Since the divided battery cells are alternately switched, i.e., the battery cells in one block are charged while those in the other block are being cooled, it is possible to efficiently charge battery cells even just before the completion of battery charge. Furthermore, the battery charger in this embodiment can charge serial battery cells with the power supply of half an output voltage.

Particularly, charge completion is determined based on whether or not the temperature rise value is relatively high and the frequency, with which a relatively low allowable current value is outputted from the map, is high, i.e., whether or not temperature rise is large and temperature rise is still large even with a charging current value being lowered. Due to this, it is possible to 100% charge the battery cells without overcharge. Further, since this battery charger determines the completion of charge by dividing battery cells, it is possible to accurately determine the completion of charge compared with a case of simultaneously determining it for all battery cells. That is, although the temperature of the nickel metal hydride battery cells tends to rise during battery charge and the battery pack including many battery cells tends to accumulate heat inside, it is possible to properly determine the completion of charge of the battery pack 50. Besides, since battery charge is conducted by dividing battery cells, the temperatures of the battery cells in the battery pack are less irregular and all the cells can be charged to a uniform capacity to thereby lengthen battery life.

Next, a battery charger in the second embodiment according to the present invention will be described with reference to FIGS. 7 to 9.

Figure 7:
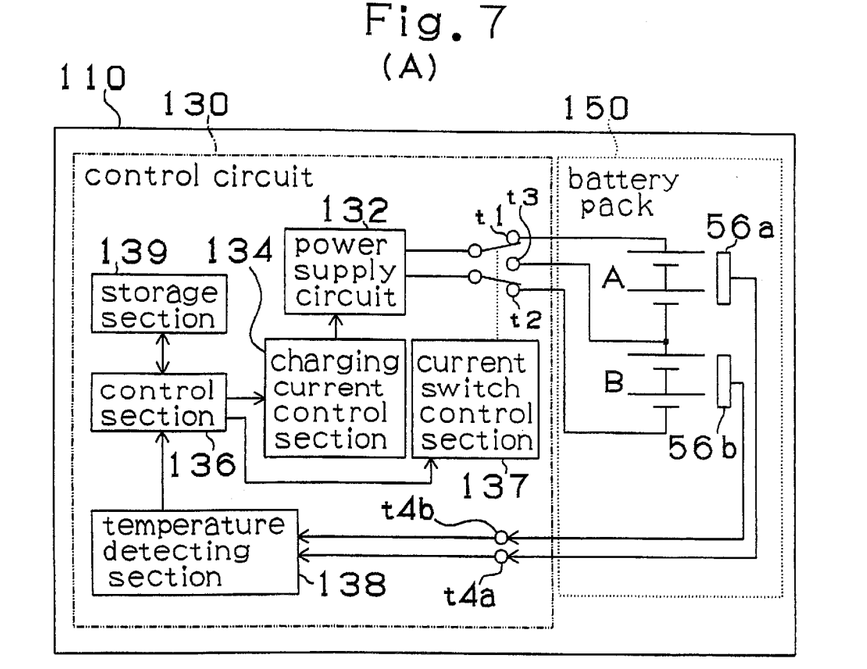
FIGS. 7A and 7B are block diagrams showing a control circuit in a battery charger in the second embodiment.
Figure 8:
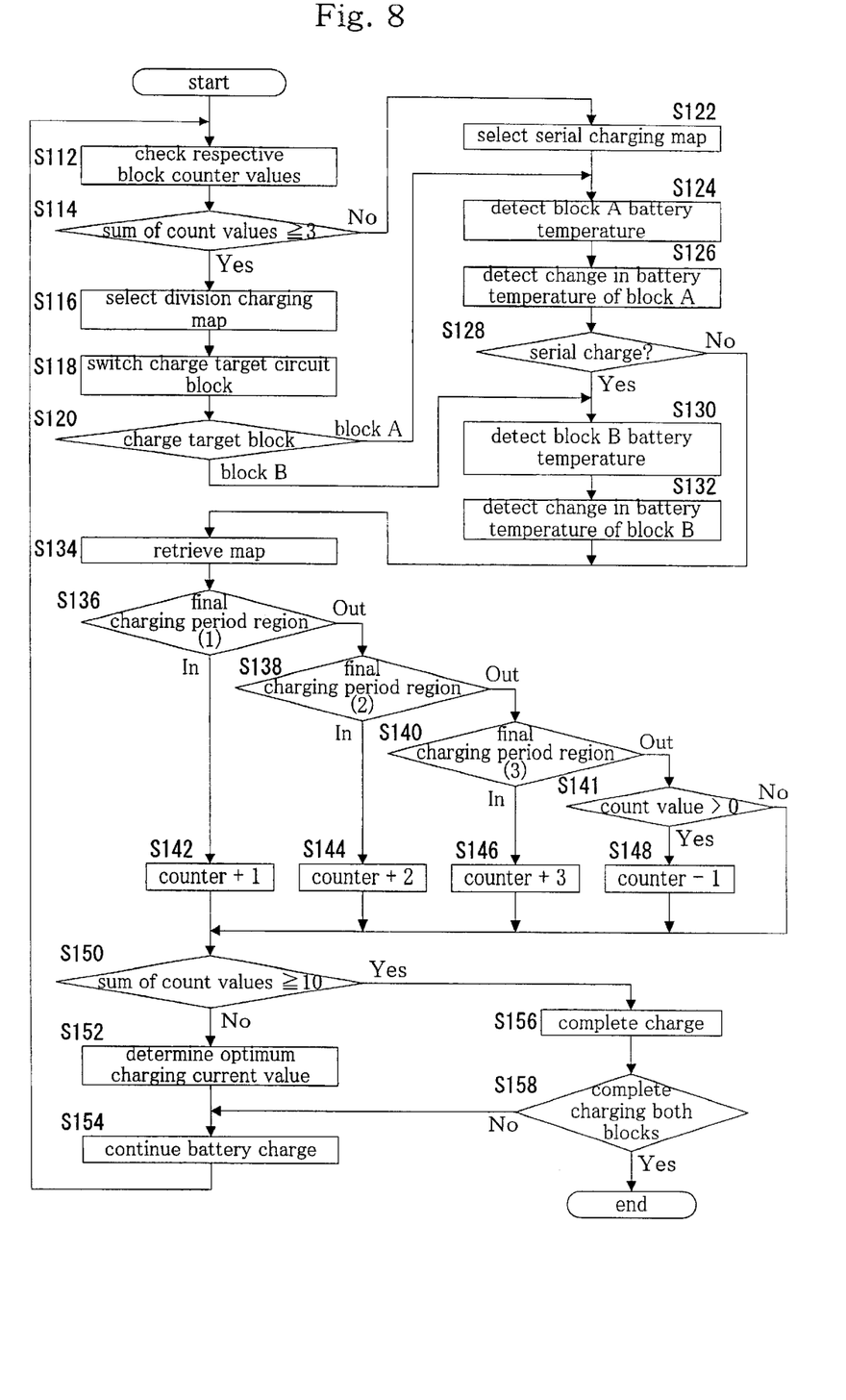
FIG. 8 is a flow chart showing processing of the control circuit in the second embodiment.

FIG. 7 shows the configuration of a battery charger 110 in the second embodiment. The battery charger in the first embodiment which has been described above with reference to FIG. 4 charge battery cells after dividing the battery pack 50 into the block A and the block B. The battery charger 110 in the second embodiment, by contrast, charges the overall battery pack 50, i.e., simultaneously charges battery cells in the block A and those in the block B at the start of battery charge as shown in FIG. 7(A). In the final charging period, as shown in FIG. 7(B), the battery cells in the block A and those in the block B are separately charged. (FIG. 7(B) shows a state in which the block A is being charged.) Namely, a power supply circuit 132 in the second embodiment is constituted to switch potential between a potential of 36V for charging the battery pack with rated 24V and a potential of 18V for charging the battery pack (blocks A and B) with 12V. The battery charger in the second embodiment is provided with a temperature sensor 56a for detecting battery temperatures in the block A and a temperature sensor 56b for detecting battery temperatures in the block B.

Figure 9:
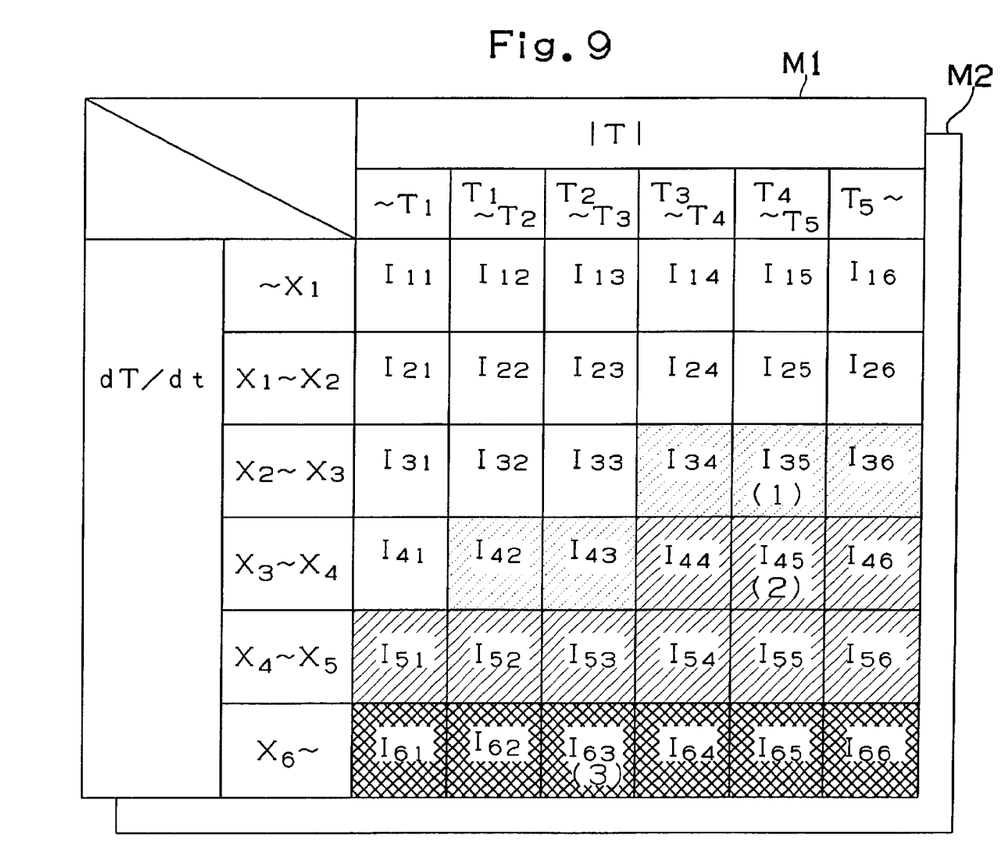
FIG. 9 is an explanatory view for the contents of maps held by the control circuit in the second embodiment.

FIG. 9 shows the contents of maps held by a storage section 139 in the battery charger in the second embodiment. In the above-stated first embodiment, only one map is held for charge control for the blocks A and B. The battery charger in this embodiment includes a map M1 for separately charging the block A and the block B and a map M2 for simultaneously charging the blocks A and B.

The charge operation of the battery charger 110 in the second embodiment will be described with reference to the flow chart of FIG. 8.

The control section of a control circuit (see FIG. 7) checks a block A counter indicating the progress of the charge of the block A (first to tenth battery cells) and a block B counter indicating the progress of the charge the block B (eleventh to 20th battery cells) (in S112) and determines whether the sum of the count values is not more than 3, i.e., whether the blocks are in an initial charging period (in S114) In case of the initial charging period ("No"in S114), the processing goes to a step 122, where the map M2 for simultaneously charging both the block A and the block B is selected (in S122). First, the absolute temperature T of nickel metal hydride battery cells in the blockA is detected (in S124) Next, the inputted absolute temperature T is differentiated and a change in battery temperature dT/dt is calculated (in S126) If the result of the determination of the step 128 is "Yes", then the absolute temperature T of the nickel metal hydride battery cells in the block B is detected (in S130). Next, the inputted absolute temperature T is differentiated and a change in battery temperature dT/dt is calculated (in S132). Based on the absolute temperature T and the change in temperature dT/dt, an optimum charging current is selected from the above-stated map M2 with reference to FIG. 9 (in S134). In the initial charging period, the absolute temperature T is low and the change in battery temperature dT/dt is small, so that a relatively high current is retrieved.

Thereafter, the control section 136 determines whether the absolute temperature T and the change in temperature dT/dt enter final charging period regions in the map in steps 136 to 148. After it is determined whether the sum of the count values exceeds 10 ("No" in S150), the battery cells are charged with the current value retrieved in the step 134 (in S152 and S154). Here, the serial charge of the blocks A and B continues unless the sum of the count value of the block A and that of the block B exceeds 3 ("No" in S114).

If the charging period is closer to the final charging period and the sum of the count value of the block A and that of the block B exceeds 3 ("Yes" in S114), then charge operation starts to separately charge the block A and the block B. In this case, the map M1 for separate charge shown in FIG. 9 is first selected (in S116) and it is determined which block is set as a charge target block, the block A or the block B (in S120). If the block A is set as the charge target block, the processing goes to a step 124, where the absolute temperature T of the nickel metal hydride battery cells in the block A is detected (in S124). Next, the inputted absolute temperature T is differentiated and a change in battery temperature dT/dt is calculated (in S126). Thereafter, based on the absolute temperature T and the change in temperature dT/dt, an optimum charging current is selected from the above-stated map M1 with reference to FIG. 9 (in S134).

Then, the control section 136 determines whether the absolute temperature and the change in temperature enter final charging period regions in the map in steps 136 to 148. After it is determined whether the sum of the count values exceeds 10 ("No" in S150), the block A is charged with the current value retrieved in the step 134 as shown in FIG. 7(B) (in S152 and S154).

When a predetermined time (20 seconds) passes, the charge target block is switched (in S18). In this case, the control section 136 controls a current switch control section 137, whereby the charge terminals of the power supply circuit 132 are switched from the first terminal t1—the intermediate terminal t3 to the intermediate terminal t3—the second terminal t2 and the charge of the block B is started (in S130 and S132). When a predetermined time (20 seconds) passes, the charge of the block A is started (in S118).

While alternately switching the block between the block A and the block B, battery charge is conducted for 20 seconds apiece. In the final charging period, if the battery temperature and the temperature rise value enter regions which tend to occur in the initial charge completion period (final charging period region (1), i.e., I42, I43, I34, I35 and I36 ("In" in S136), then the block A counter is incremented by "1" during the charge of the block A and the block B counter is incremented by "1" during the charge of the block B (in S142). If they enter regions which tend to occur in the medium charge completion period (final charging period region (2)), i.e., I51, I52, I53, I44, I45, I46, I54, I55 and I56 ("In" in S138), then the counter is incremented by "2" (in S144). Further, if they enter regions which tend to occur in the final charge completion period (final charging period region (3)), i.e., I61, I62, I63, I64, I65 and I66 ("In" in S140), then the counter is incremented by "3" (in S146). In the determination as to whether the sum of the count values exceed a preset value (10) (in S150), if the absolute temperature and the change in temperature continuously enter the above-stated final charging period regions and the sum of the count values exceeds the preset value of 10 ("Yes" in S150), then the charge of the corresponding block (e.g., the block A) is completed (in S156). Then, until the charge of the block B is completed, that is, until the count value of the block B becomes 10 ("No" in S158), battery charge is continued (in S154). Thereafter, if the charge of the block B is completed ("Yes" in S158), charge processing is completed.

The battery charger in the second embodiment retrieves the maps based on a battery temperature and a temperature rise value, obtains an allowable current value with which the battery can be charged while the battery temperature rise is being suppressed, and then charges the battery with the allowable current value. This makes it possible to charge the nickel metal hydride battery cells which temperature tends to rise during charge, in a short time without causing deterioration due to temperature rise. Further, since all the battery cells are simultaneously charged at the beginning of battery charge in which lower heat generated and then the battery cells are charged while dividing the battery cells and alternately switching the charge target battery cells, i.e., while cooling those in one block in the final charging period in which high heat is generated, it is possible to efficiently charge the battery cells in a short time.

Particularly, charge completion is determined based on whether or not the temperature rise value is relatively high and the frequency, with which a relatively low allowable current value is outputted from the map, is high, i.e., whether or not temperature rise is large and temperature rise is still large even with a charging current value being lowered. Due to this, it is possible to 100% charge the battery cells without overcharge. Further, since this battery charger determines the completion of charge by dividing battery cells, it is possible to accurately determine the completion of charge compared with a case of simultaneously determining it for all battery cells. That is, although the temperature of the nickel metal hydride battery cells tends to rise during battery charge and the battery pack including many battery cells tends to accumulate heat inside, it is possible to properly determine the completion of charge of the battery pack 50. Besides, since battery charge is conducted by dividing battery cells, the temperatures of the battery cells in the battery pack are less irregular and all the cells can be charged to a uniform capacity to thereby lengthen battery life.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charger dividing and charging a battery consisting of a plurality of battery cells, characterized by comprising:

a storage device storing a map, in which an allowable current value, with which the battery can be charged while a temperature rise of the battery is being suppressed, is mapped based on a battery temperature value and a battery temperature rise value;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging said divided battery with the allowable current value retrieved by said allowable current value retrieving section; and a charge switching section for alternately switching divided blocks to be charged by said charging section.

2. A battery charger dividing a battery consisting of a plurality of battery cells into two or more blocks and charging the divided blocks, characterized by comprising:

a storage device storing a map, in which an allowable current value, with which the battery can be charged while a temperature rise of the battery is being suppressed, is mapped based on a battery temperature value and a battery temperature rise value, the allowable current value set at a low value if the battery temperature value is high and set at a low value if the temperature rise value is high;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging said divided battery blocks with the allowable current value retrieved by said allowable current value retrieving section;

a charge switching section for alternately switching the divided battery blocks to be charged by said charge section;

a charge completion determining section for determining completion of charge of each of the divided battery blocks based on whether frequency, with which the temperature detected by said temperature detecting section and the temperature rise value outputted from said temperature rise value outputting section belong to regions indicating a final charging period in the map of said storage device, is high; and a charge completing section for completing charge of the divided battery blocks based on determination of completion of battery charge by said charge completion determining section.

3. A battery charger capable of simultaneously a battery consisting of a plurality of battery cells and dividing the battery into two or more blocks and then charging the divided battery blocks, characterized by comprising:

a storage device storing a map, in which an allowable current value, with which the battery can be charged while a temperature rise of the battery is being suppressed, is mapped based on a battery temperature value and a battery temperature rise value;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging the battery with the allowable current value retrieved by said allowable current value retrieving section; and a charge switching section for switching said charging section and charging the battery consisting of the plurality of battery cells simultaneously or charging the battery separately, wherein said charge switching section simultaneously charges the battery consisting of the plurality of battery cells at beginning of battery charge, and alternately switches the divided battery blocks and charges the divided battery blocks in a final charging period.

4. A battery charger dividing a battery consisting of a plurality of cells into two or more blocks and charging the divided battery blocks, characterized by comprising:

a storage device storing a map, in which an allowable current value, with which the battery can be charged while a temperature rise of the battery is being suppressed, is mapped based on a battery temperature value and a battery temperature rise value, the allowable current value set at a low value if the battery temperature value is high and set at a low value if the temperature rise value is high;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charge switching section for switching said charging section and charging the battery consisting of the plurality of battery cells simultaneously or charging the battery separately;

a final charging period determining section for determining that a battery charge period is in a final charging period based on whether or not frequency, with which the temperature detected by said temperature detecting section and the temperature rise value outputted from said temperature rise value outputting section belong to regions indicating the final charging period in the map of said storage section, is high; and a charge completion determining section for determining completion of charge of each of the divided battery blocks based on whether or not the frequency, with which the temperature detected by said temperature detecting section and the temperature rise value outputted from said temperature rise value outputting section belong to the regions indicating the final charging period in the map of said storage section, is high, wherein said charge switching section simultaneously charges the battery consisting of the plurality of battery cells at beginning of battery charge and, if the battery charge period is determined to be in the final charging period by said final charging period determining section, alternately switches the battery divided by the charge switching section and charges the battery until said charge completion determining section determines the completion of charge.

* * * * *